(12) United States Patent
LeBrun

(10) Patent No.: US 12,391,167 B2
(45) Date of Patent: *Aug. 19, 2025

(54) STRAP WINDING DEVICE

(71) Applicant: Mark D. LeBrun, Osakis, MN (US)

(72) Inventor: Mark D. LeBrun, Osakis, MN (US)

( * ) Notice: Subject to any disclaimer, the term of this patent is extended or adjusted under 35 U.S.C. 154(b) by 467 days.

This patent is subject to a terminal disclaimer.

(21) Appl. No.: 17/965,978

(22) Filed: Oct. 14, 2022

(65) Prior Publication Data

US 2023/0202378 A1 Jun. 29, 2023

Related U.S. Application Data

(63) Continuation of application No. 17/006,330, filed on Aug. 28, 2020, now Pat. No. 11,479,160.

(51) Int. Cl.
*B60P 7/00* (2006.01)
*B60P 7/08* (2006.01)

(52) U.S. Cl.
CPC ............ *B60P 7/0846* (2013.01); *B60P 7/083* (2013.01); *B60P 7/0853* (2013.01)

(58) Field of Classification Search
CPC .......... B60P 7/0846; B60P 7/083; B60P 7/08; B60P 7/0853
See application file for complete search history.

(56) References Cited

U.S. PATENT DOCUMENTS

| | | |
|---|---|---|
| 3,954,226 A | 5/1976 | Pickering |
| 4,007,887 A | 2/1977 | Vice |
| 4,266,740 A | 5/1981 | Ramos |
| 4,311,288 A | 1/1982 | Galland |
| 4,390,141 A | 6/1983 | Webster |
| 5,961,061 A | 10/1999 | Stanley |
| 6,179,534 B1 | 1/2001 | Weckter |
| 6,916,143 B2 | 7/2005 | Guenther |
| 7,017,847 B2 | 3/2006 | Treat |
| 7,464,916 B1 | 12/2008 | Drinkhorn |
| 8,172,203 B2 | 5/2012 | Chou |
| 8,192,119 B1 | 6/2012 | Small |
| 9,963,063 B2 | 5/2018 | Fernandez |
| 2004/0202520 A1 | 10/2004 | Guenther |
| 2009/0302144 A1 | 12/2009 | Baer |
| 2014/0110520 A1 | 4/2014 | Hampson |
| 2016/0339830 A1 | 11/2016 | McLemore |

*Primary Examiner* — Steven O Douglas
(74) *Attorney, Agent, or Firm* — Neustel Law Offices

(57) ABSTRACT

A strap winding device for efficiently and easily winding up a strap such as a cargo strap after use. The strap winding device generally includes a main body which is adapted to rest upon a structure such as a trailer on a vehicle such as a truck. A mount may be connected to the main body, with the mount being removably inserted within an opening on the trailer, such as a trailer stake pocket. A winder is rotatably connected to the mount by a sleeve, with the winder being operable to rotate a reel onto which the strap may be wound. The reel includes a pair of prongs which are tapered towards each other to ease removal of the strap after winding.

20 Claims, 10 Drawing Sheets

STRAP WINDING DEVICE

CROSS REFERENCE TO RELATED APPLICATIONS

The present application is a continuation of U.S. application Ser. No. 17/006,330 filed on Aug. 28, 2020 which issues as U.S. Pat. No. 11,479,160 on Oct. 25, 2022. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a strap winding device for efficiently and easily winding up a strap such as a cargo strap after use.

Related Art

Any discussion of the related art throughout the specification should in no way be considered as an admission that such related art is widely known or forms part of common general knowledge in the field.

From strapping down pallets in the hold of a cargo aircraft to strapping down a mattress in the bed of a pickup truck, cargo straps have become ubiquitous with shipping and transport of a wide range of loads with a wide range of vehicles. However, cargo straps can present a dilemma after reaching the destination and unloading the cargo. One would prefer not to fumble with winding up a cargo strap after a long day of transporting cargo, particularly during or after unloading the cargo.

Various methods and devices have been offered to assist with winding up a cargo strap after use. A very common method is to simply use one's hands, with the first hand gripping the strap and the other hand winding the strap out the first hand. However, it can be easy to drop or tangle the cargo strap when winding with one's hands in such a manner. Power drills can be used, but typically require a power source such as a wall outlet or a charged battery.

SUMMARY

An example embodiment is directed to a strap winding device. The strap winding device includes a main body which is adapted to rest upon a structure such as a trailer on a vehicle such as a truck. A mount may be connected to the main body, with the mount being removably inserted within an opening on the trailer, such as a trailer stake pocket. A winder is rotatably connected to the mount by a sleeve, with the winder being operable to rotate a reel onto which the strap may be wound. The reel includes a pair of prongs which are tapered towards each other to ease removal of the strap after winding.

There has thus been outlined, rather broadly, some of the embodiments of the strap winding device in order that the detailed description thereof may be better understood, and in order that the present contribution to the art may be better appreciated. There are additional embodiments of the strap winding device that will be described hereinafter and that will form the subject matter of the claims appended hereto. In this respect, before explaining at least one embodiment of the strap winding device in detail, it is to be understood that the strap winding device is not limited in its application to the details of construction or to the arrangements of the components set forth in the following description or illustrated in the drawings. The strap winding device is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
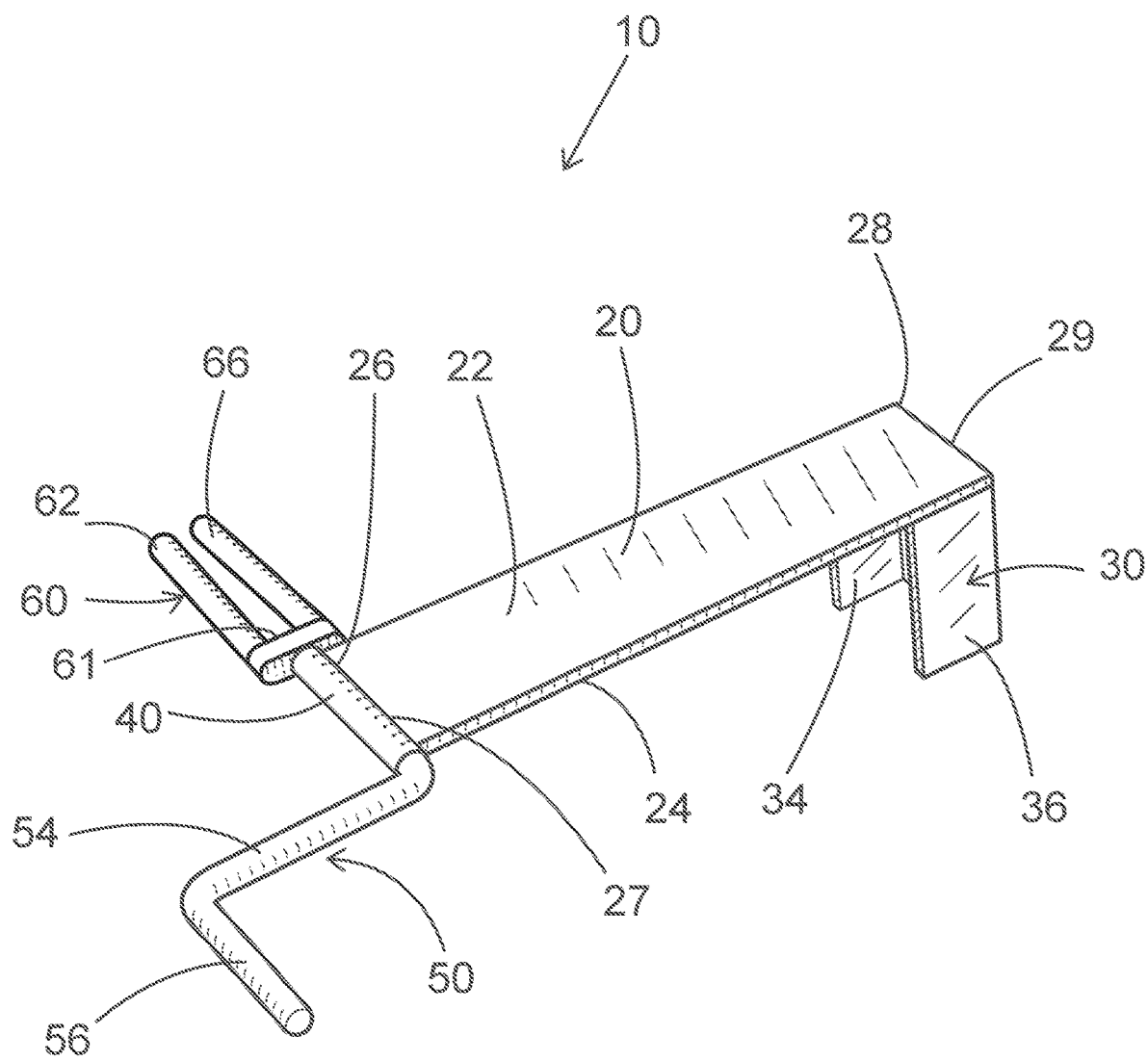
FIG. 1 is a perspective view of a strap winding device in accordance with an example embodiment.

An example strap winding device 10 generally comprises a main body 20 comprising an upper end 22, a lower end 23, a first end 26, and a second end 28; a mount 30 connected to the main body 20 so as to extend downwardly with respect to the main body 20, wherein the mount 30 is connected at or near the second end 28 of the main body 20; a sleeve 40 connected to the main body 20 at or near the first end 26 of the main body 20, wherein the sleeve 40 comprises an elongated opening 46; a winder 50 rotatably connected within the elongated opening 46 of the sleeve 40, the winder 50 being adapted to freely rotate within the elongated opening 46 of the sleeve 40, wherein the winder 50 comprises a handle 56 adapted to rotate the winder 50; and a reel 60 connected to the winder 50, wherein the reel 60 comprises a first prong 62 and a second prong 66, wherein the first prong 62 and the second prong 66 are angled towards each other, wherein the first prong 62 and the second prong 66 are each adapted to rotate when the handle 56 is rotated so as to wind a strap 18 around the first prong 62 and the second prong 66.

The main body 20 may be comprised of a rectangular plate and the sleeve 40 may be comprised of a cylindrical member. The mount 30 may be comprised of a C-channel, wherein the mount 30 is connected to the lower end 24 of the main body 20 at or near the second end 28 of the main body 20. The mount 30 may be at a right angle with respect to the main body 20 such that the mount 30 extends perpendicularly with respect to the main body 20.

The winder 50 may comprise a bent rod. The winder 50 may comprise a main portion 52 adapted to be positioned within the elongated opening 46 of the sleeve 40 and a linkage 54 extending at a right angle with respect to the main portion 52. The handle 56 may extend at a right angle with respect to the linkage 54. A length of the main body 20 may be greater than a length of the mount 30. The first prong 62 and the second prong 66 may each be comprised of a rod. The sleeve 40 may comprise a first end 42 and a second end 44, wherein the reel 60 extends from the first end 42 of the sleeve 40 and wherein the winder 50 extends from the second end 44 of the sleeve 40.

The reel 60 may comprise a base 61, wherein the first prong 62 and the second prong 66 each extend outwardly from the base 61. The first prong 62 may comprise a first end 63 and a second end 64 and the second prong 66 may comprise a first end 67 and a second end 68, wherein a first distance between the first end 63 of the first prong 62 and the first end 67 of the second prong 66 is greater than a second distance between the second end 64 of the first prong 62 and the second end 68 of the second prong 66.

Another exemplary embodiment of the strap winding device 10 may comprise a main body 20 comprising an upper end 22, a lower end 24, a first end 26, and a second end 28; a mount 30 connected to the lower end 24 of the main body 20 so as to extend downwardly from the second end 28 of the main body 20; a sleeve 40 connected to the first end 26 of the main body 20, wherein the sleeve 40 comprises an elongated opening 46; a winder 50 rotatably connected within the elongated opening 46 of the sleeve 40, the winder 50 being adapted to freely rotate within the elongated opening 46 of the sleeve 40, wherein the winder 50 comprises a handle 56 adapted to rotate the winder 50; and a reel 60 connected to the winder 50, wherein the reel 60 comprises a first prong 62 and a second prong 66, wherein the first prong 62 and the second prong 66 are angled towards each other, wherein the first prong 62 and the second prong 66 are each adapted to rotate when the handle 56 is rotated so as to wind a strap 18 around the first prong 62 and the second prong 66. The mount 30 and the main body 20 may be integrally formed of a unitary structure. The mount 30 may extend perpendicularly with respect to the main body 20. The mount 30 may comprise an end member 32, a first side member 34 connected to a first side of the end member 32, and a second side member 36 connected to a second side of the end member 32.

Also disclosed is a method of winding a strap 18 using the strap winding device 10, comprising the steps of: inserting the mount 30 into an opening 15 of a trailer 14 such that the main body 20 extends over the trailer 14; inserting a distal end of the strap 18 between the first prong 62 and the second prong 66; rotating the handle 56 so as to rotate the winder 50 and the reel 60; and winding the strap 18 around the first prong 62 and the second prong 66 of the reel 60. The opening 15 of the trailer 14 may comprise a trailer stake pocket.

B. Main Body, Mount, and Sleeve

As shown throughout the figures, the strap winding device 10 generally comprises a main body 20 which is adapted to rest upon a surface such as a trailer 14 as shown in FIGS. 7-10. The shape and size of the main body 20 may vary in different embodiments. In the exemplary embodiment shown in FIG. 1, it can be seen that the main body 20 comprises a rectangular member such as an elongated rectangular plate. This exemplary embodiment should not be construed as limiting in scope, however, as the main body 20 could comprise a wide range of shapes.

Figure 2:
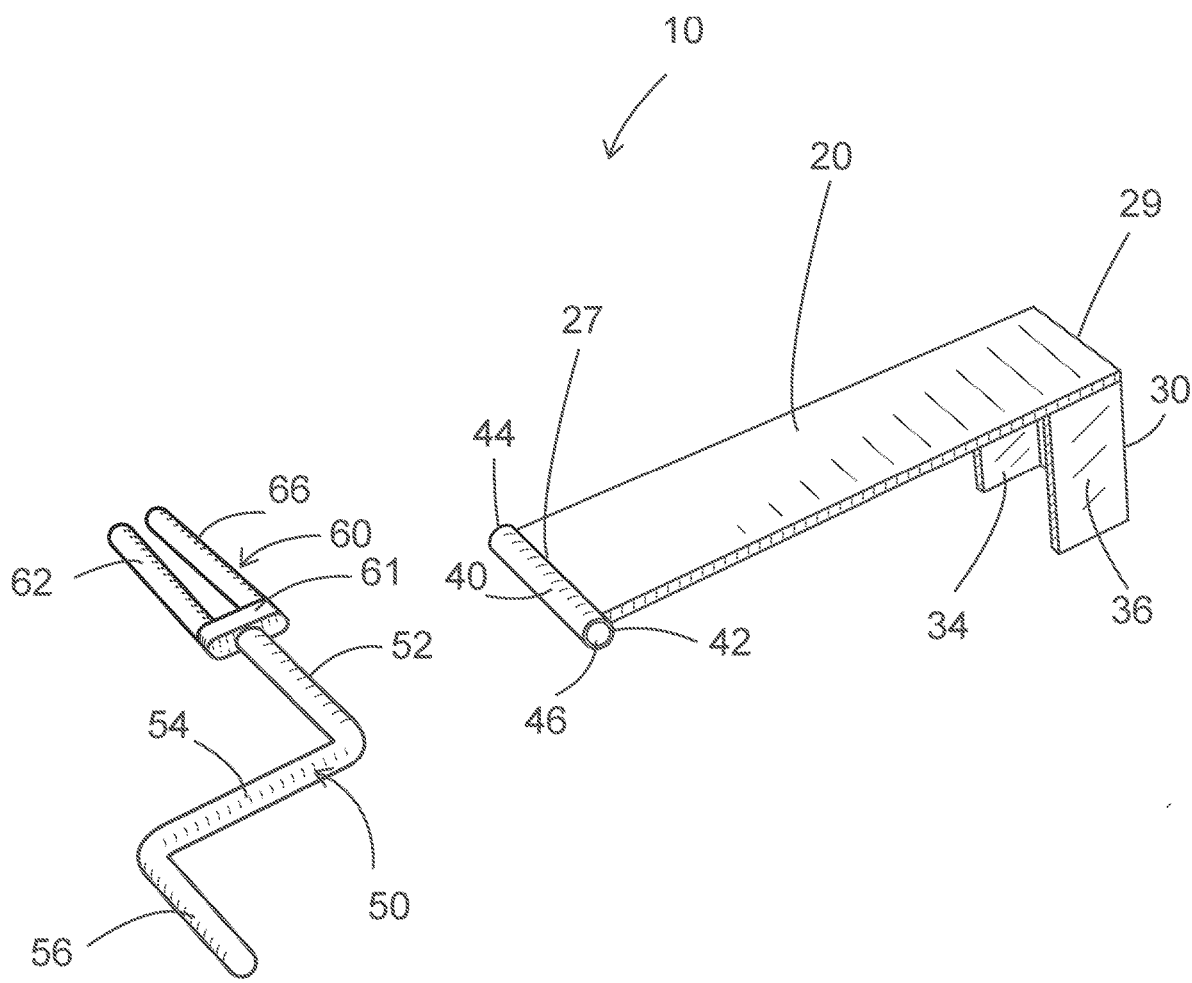
FIG. 2 is an exploded perspective view of a strap winding device in accordance with an example embodiment.

As shown in FIGS. 1 and 2, the main body 20 comprises an upper end 22, a lower end 24, a first end 26, and a second end 28. The main body 20 includes an inner edge 27 on its first end 26 which faces the operator when the strap winding device 10 is in use. The main body 20 also includes an outer edge 29 on its second end 28 which faces the trailer 14 when the strap winding device 10 is in use.

Continuing to reference FIGS. 1 and 2, it can be seen that the first end 26 of the main body 20 may include a sleeve 40. The sleeve 40 may be connected to the main body 20, or may be integrally formed of a unitary structure therewith. The positioning of the sleeve 40 may vary in different embodiments. In the exemplary embodiment shown in the figures, the sleeve 40 is illustrated as being connected to the inner edge 27 on the first end 26 of the main body 20. However, the positioning of the sleeve 40 on the main body 20 may vary in different embodiments. In such alternate embodiments, the sleeve 40 may be offset with respect to the inner edge 27 of the main body 20.

In such embodiments, the sleeve 40 may be connected near the first end 26 of the main body 20, but not on the inner edge 27 of the main body 20. By way of example, the sleeve 40 could be connected in some embodiments to the upper end 22 of the main body 20, at or near the first end 26 of the main body 20. In other embodiments, the sleeve 40 could be connected to the lower end 24 of the main body 20, at or near the first end 26 of the main body 20.

As best shown in FIGS. 1, 2, and 4-10, the second end 28 of the main body 20 includes a mount 30 which is adapted to be removably secured within an opening 15 such as a stake pocket 15 of a trailer 14. The mount 30 may be connected to the main body 20, such as by welding, or may be integrally formed of a unitary structure with the main body 20.

The exemplary embodiment shown in the figures illustrates that the mount 30 is connected to the outer edge 29 of the main body 20 on its second end 28. However, the positioning of the mount 30 on the main body 20 may vary in different embodiments. In such alternate embodiments, the mount 30 may be offset with respect to the outer edge 29 of the main body 20. In such embodiments, the mount 30 may be connected near the second end 28 of the main body 20.

As shown in FIGS. 7-10, the mount 30 is utilized to secure the strap winding device 10 to the mounting point, such as the trailer 14 of a vehicle 12. More specifically and as shown in FIGS. 7-10, the mount 30 may be utilized to secure the strap winding device 10 within an opening 15 such as a stake pocket in the trailer 14 of the vehicle 12. While the figures illustrate the mount 30 being removably inserted within such a stake pocket in a trailer 14 of a vehicle 12 comprised of a transport truck, it should be appreciated that the mount 30 may be configured to be removably inserted in various other types of receiver openings 15. Further, the strap winding device 10 is not limited for use with any specific type of vehicle 12, and thus the truck shown in the figures should not be construed as limiting, as it is merely for illustrative purposes.

Figure 4:
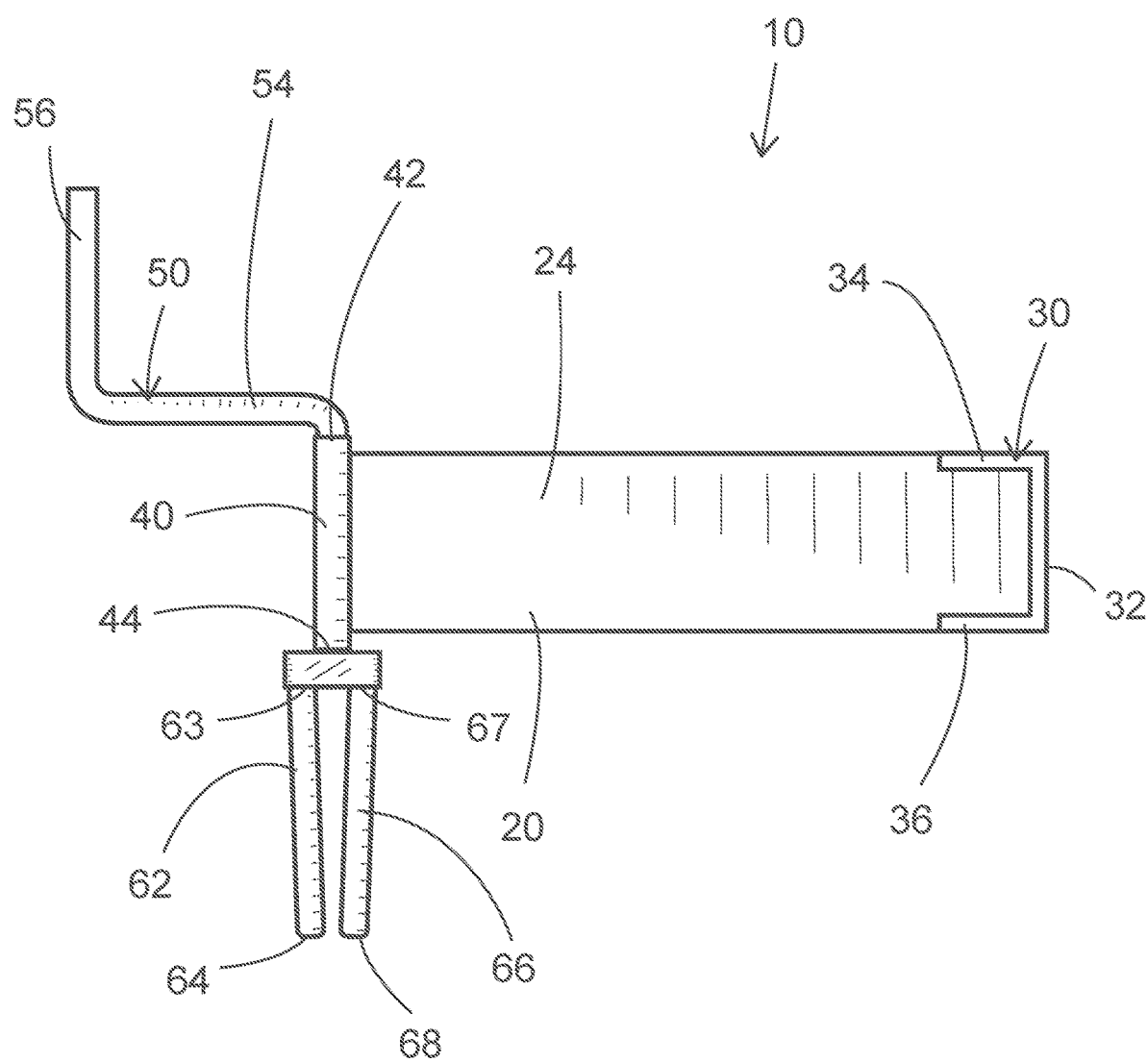
FIG. 4 is a bottom view of a strap winding device in accordance with an example embodiment.
Figure 5:
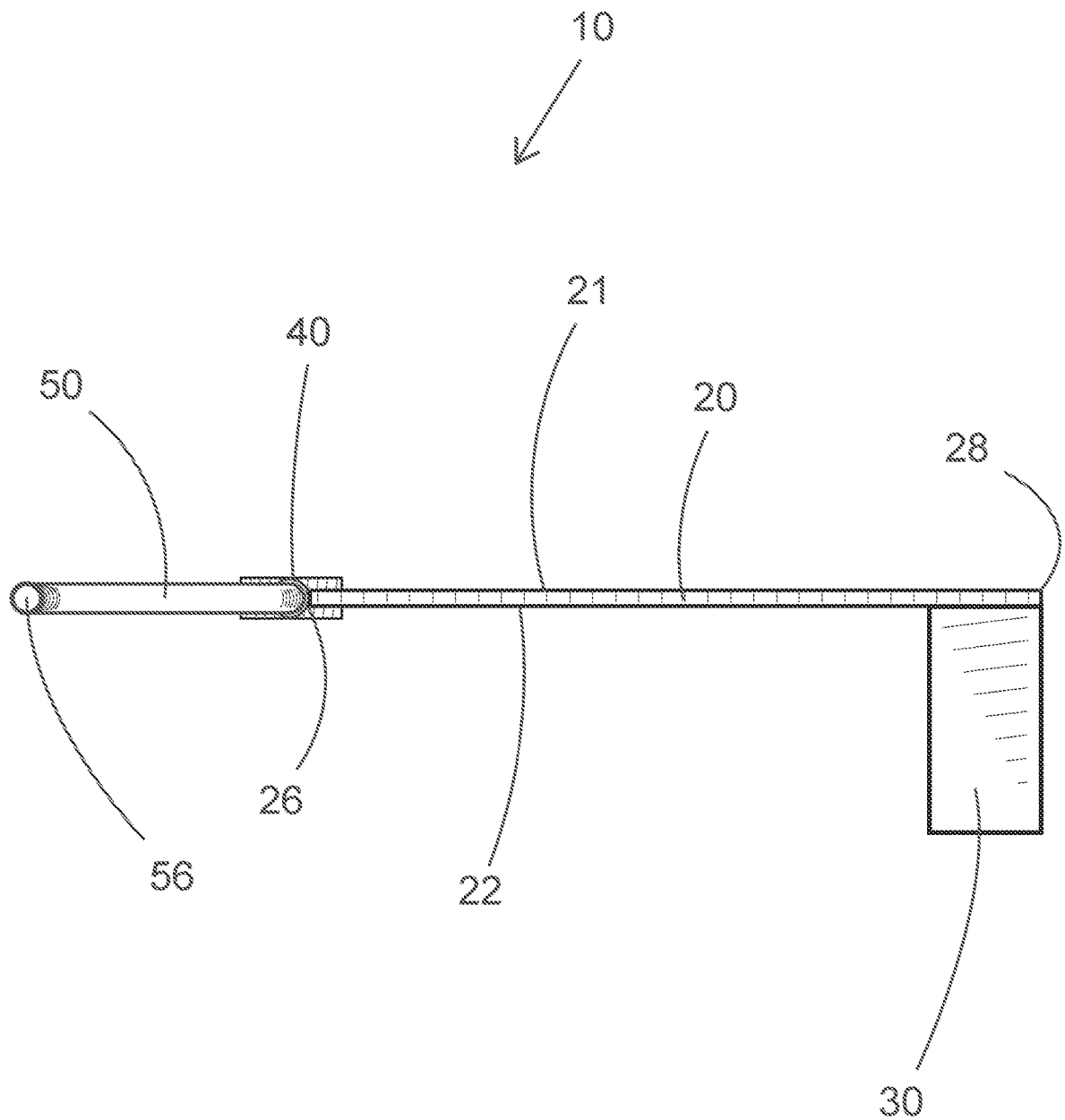
FIG. 5 is a side view of a strap winding device in accordance with an example embodiment.

With reference to FIGS. 1, 2, and 4, it can be seen that the mount 30 may comprise a C-channel structure having an end member 32, a first side member 34, and a second side member 36. The mount 30 may thus comprise a C- or U-shaped configuration as shown in the figures, with the first and second side members 34, 36 being parallel to each other and perpendicular with respect to the end member 32.

The manner in which the mount 30 is connected to the main body 20 may vary in different embodiments. In the exemplary embodiment shown in the figures, it can be seen that the mount 30 is connected to the main body 20 at the outer edge 29 of the main body 20. In some embodiments, the mount 30 may be offset with respect to the outer edge 29 of the main body 20, such as by being connected near the second end 28 of the main body 20.

In the figures, the mount 30 is illustrated as being connected to the lower end 24 of the main body 20 adjacent to the outer edge 29 of the main body 20. In such an embodiment, the end member 32 is connected so as to extend downwardly from the second end 28 of the main body 20, with the first and second side members 34, 36 extending from the respective sides of the end member 32 at a perpendicular angle. Thus, the first side member 34 may extend downwardly from a point at or near a first side of the main body 20 and the second side member 36 may extend downwardly from a point at or near a second side of the main body 20.

It should be appreciated that the manner in which the mount 30 is connected to the main body 20 may vary in different embodiments. In some embodiments, the mount 30 may be connected to the main body 20 by fasteners, adhesives, or welding. In other embodiments, the mount 30 may be integrally formed of a unitary structure with the main body 20. The end member 32, first side member 34, and second side member 36 may similarly be integrally formed of a unitary structure, or may be interconnected, with the first side member 34 being connected to a first side of the end member 32 and the second side member 36 being connected to a second side of the end member 32.

As shown in FIGS. 1-4, the strap winding device 10 may include a sleeve 40 within which a winder 50 may be rotatably positioned. The sleeve 40 may comprise a cylindrical member having an elongated opening 46 such as is shown in FIG. 2. The sleeve 40 includes a first end 42 and a second end 44, with the opening 46 extending between the first and second ends 42, 44 of the sleeve 40. In alternate embodiments, the shape of the sleeve 40 may vary. For example, the sleeve 40 may comprise various cross-sectional shapes, such as triangular or square-shaped. Preferably, the sleeve 40 will comprise a circular cross-section such as shown in the figures.

The sleeve 40 may be positioned at various locations on the main body 20. In the exemplary embodiment best shown in FIGS. 1 and 2, the sleeve 40 is illustrated as being connected to the inner edge 27 at the first end 26 of the main body 20. In different embodiments, the sleeve 40 could be connected to the upper end 22 or the lower end 24 of the main body 20.

The manner in which the sleeve 40 is connected to the main body 20 may vary in different embodiments. The sleeve 40 may be connected by adhesives, fasteners, or welding to the main body 20. In other embodiments, the sleeve 40 may be integrally formed of a unitary structure with the main body 20. In some embodiments, each of the main body 20, mount 30, and sleeve 40 may be integrally formed of a unitary structure.

The size of the sleeve 40 may also vary in different embodiments. The length of the sleeve 40 may vary depending on the width of the main body 20. The figures illustrate an embodiment in which the sleeve 40 is the same width as the main body 20, with the first end 42 of the sleeve 40 being flush with a first side of the main body 20 and the second end 44 of the sleeve 40 being flush with a second side of the main body 20. However, in alternate embodiments, the sleeve 40 could be wider, or narrower, than the width of the main body 20. Thus, the first end 42 and the second end 44 of the sleeve 40 may extend past the respective sides of the main body 20, or may be offset inwardly from the respective sides of the main body 20.

C. Winder and Reel

As best shown in FIGS. 1-5, the strap winding device 10 may include a winder 50 which is rotatably connected to the main body 20 such that the winder 50 may rotate with respect to the main body 20. In the exemplary embodiment shown in FIGS. 9 and 10, the winder 50 is illustrated as being rotatably positioned within the sleeve 40. More specifically, the winder 50 may be rotatably positioned within the elongated opening 46 of the sleeve 40.

The winder 50 generally includes a reel 60 which is adapted to rotate with the winder 50. The reel 60 may be connected to the winder 50 or may be integrally formed therewith. Generally, rotation of the winder 50 causes similar rotation in the reel 60 such that a strap 18 may be wound onto the reel 60 through rotation of the winder 50 as discussed herein.

The winder 50 may include a handle 56 which is adapted to be grasped by a user to rotate the winder 50 within the sleeve 40. The shape, size, and orientation of the handle 56 may vary in different embodiments. In the exemplary embodiment shown in FIGS. 1-4, the winder 50 may comprise a main portion 52, a linkage 54, and a handle 56.

The main portion 52 of the winder 50 is rotatably positioned within the sleeve 40. The main portion 52 of the winder 50 generally comprises a rotatable shaft having a circular cross-section such as shown in FIG. 2. However, the cross-sectional shape of the main portion 52 of the winder 50 may vary in different embodiments. Further, the size of the main portion 52 of the winder 50 may vary in different embodiments. In the embodiment best shown in FIGS. 1 and 2, the main portion 52 of the winder 50 is slightly longer in than the length of the sleeve 40. In some embodiments, the main portion 52 of the winder 50 may be substantially longer than the length of the sleeve 40.

As shown in FIG. 2, a linkage 54 may extend from a first end of the main portion 52 of the winder 50. The linkage 54 may be connected to, or integrally formed with, the main portion 52 of the winder 50. The linkage 54 may comprise a shaft having the same cross-section and size as the main portion 52 such as shown in the figures. In alternate embodiments, the linkage 54 may comprise a different cross-sectional shape than the main portion 52.

Further, the linkage 54 may comprise various sizes and should not be construed as limited by the exemplary figures. While the figures illustrate that the linkage 54 is approximately the same length as the main portion 54, in some embodiments the linkage 54 may be longer, or shorter, than the length of the main portion 54. The linkage 54 offsets the handle 56 from the main portion 52 which extends through the sleeve 40, and thus offsets the handle 56 from the main body 20 to which the sleeve 40 is connected. This ensures that there is ample room for rotation.

As shown in FIGS. 1-4, the linkage 54 may extend at a right angle with respect to the main portion 52 of the winder 50. Thus, the linkage 54 is generally perpendicular with respect to the main portion 52 from which it extends or two which it is connected. The figures illustrate an embodiment in which there is a curve between the main portion 52 and the linkage 54. In other embodiments, a hard corner may be utilized.

As best shown in FIGS. 1 and 2, a handle 56 may extend outwardly from the linkage 54. The handle 56 is adapted to be grasped by an operator of the strap winding device 10 when in use; with the handle 56 being rotated by hand so as to similarly cause the linkage 54 and main portion 52 to rotate in response to rotation of the handle 56.

The handle 56 may comprise a shaft having the same or similar cross-sectional shape and size as the main portion 52 and linkage 54. Thus, as shown in FIG. 2, each of the main portion 52, linkage 54, and handle 56 may comprise a shaft having a circular cross-section and each may comprise substantially the same size. In other embodiments, however, the main portion 52, linkage 54, and/or handle 56 may differ in size or shape. The handle 56 could be longer or shorter than the length of the main portion 52 or linkage 54, or may comprise the same length.

The handle 56 may be connected to, or integrally formed with, the linkage 54. In some embodiments, the entire winder 50, comprised of the main portion 52, linkage 54, and handle 56, may be integrally formed of a unitary structure. In other embodiments, one or more of the main portion 52, linkage 54, and/or handle 56 may be discreetly interconnected rather than integrally formed, such as by welding, fasteners, or adhesives.

Continuing to reference FIG. 2, it can be seen that the handle 56 extends at a right angle with respect to the linkage 54. Thus, in the exemplary embodiment shown in the figures, the handle 56 may be perpendicular with respect to the linkage 54. However, in other embodiments, the angle between the handle 56 and linkage 54 may vary. In some embodiments, the handle 56 may extend diagonally with respect to the linkage 54 via obtuse or acute angles. While the figures illustrate a curve between the link age 54 and the handle 56, it should be appreciated that in some embodiments a hard corner may instead be utilized.

The main portion 52, linkage 54, and handle 56 are configured so as to offset the handle 56 from the main body 20. In the exemplary embodiment best shown in FIG. 2, the main portion 52 and handle 56 are parallel with respect to each other and offset by the main linkage 54, which is perpendicular to both the main portion 52 and the handle 56. In other embodiments, different angles other than right angles may be utilized between the main portion 52 and linkage 54, or between the linkage 54 and the handle 56.

As best shown in FIGS. 1-5, the strap winding device 10 may include a reel 60 onto which the strap 18 may be wound and temporarily secured prior to removal from the reel 60. The reel 60 is rotatable so as to wind the strap onto the reel 60, with the reel 60 being rotated by rotation of the winder 50. It should be appreciated that the reel 60 illustrated in the figures is merely for exemplary purposes, and thus should not be construed as limiting in scope with respect to size, shape, orientation, and configuration.

In the exemplary embodiment best shown in FIGS. 1-5, the reel 60 is illustrated as comprising a first prong 62 and a second prong 66 which work in concert to wind a strap 18 onto the reel 60. Each of the first prong 62 and second prong 66 may comprise an elongated member such as a rod or shaft which extend outwardly with respect to a side of the main body 20. In the embodiment shown in the figures, the first prong 62 and second prong 66 are each comprised of the same shape and size. However, in alternate embodiments, the first prong 62 may be comprised of a different shape or size than the second prong 66.

As best shown in FIGS. 1-5, the prongs 62, 66 extend outwardly from the sleeve 40 and the main body 20 of the strap winding device 10. The prongs 62, 66 may extend laterally from the sleeve 40 at various angles and at various orientations, and thus should not be construed as limited by the exemplary embodiments shown in the figures. The prongs 62, 66 are interconnected (indirectly connected) with the handle 56 such that rotation of the handle 56 is operable to similarly rotate the prongs 62, 66.

The shape, size, configuration, and orientation of the reel 60 may vary in different embodiments. In the exemplary embodiment shown in the figures, the reel 60 comprises a base 61 from which the prongs 62, 66 extend. The manner in which the prongs 62, 66 are connected to the base 61 may vary. By way of example, the prongs 62, 66 could be connected by welding, fasteners, or adhesives. In other embodiments, the prongs 62, 66 may be integrally formed of a unitary structure with the base 61.

As shown in FIGS. 1-5, the first prong 62 includes a first end 63 and a second end 64 opposite to the first end 63. The first end 63 of the first prong 62 is positioned near the main body 20 and sleeve 40 and the second end 64 of the first prong 62 is positioned distally with respect to the main body 20 and sleeve 40. The size of the first prong 62 may vary in different embodiments to suit different types of straps 18. A wider strap 18 will necessitate a longer first prong 62 while a narrower strap 18 will work with a shorter first prong 62.

The shape of the first prong 62 may vary in different embodiments to suit different types of straps 18. The first prong 62 may be of uniform circumference or width between its first end 63 and second end 64, or may be tapered. The figures illustrate that the first prong 62 comprises a circular cross-section. However, in other embodiments, different shapes may be utilized for the cross-section of the first prong 62.

Continuing to reference FIGS. 1-5, the second prong 66 includes a first end 67 and a second end 68 opposite to the first end 67. The first end 67 of the second prong 66 is positioned near the main body 20 and sleeve 40 and the second end 68 of the second prong 66 is positioned distally with respect to the main body 20 and sleeve 40. The size of the second prong 66 may vary in different embodiments to suit different types of straps 18. A wider strap 18 will necessitate a longer second prong 66 while a narrower strap 18 will work with a shorter second prong 66.

The shape of the second prong 66 may vary in different embodiments to suit different types of straps 18. The second prong 66 may be of uniform circumference or width between its first end 63 and second end 64, or may be tapered. The figures illustrate that the first prong 62 comprises a circular cross-section. However, in other embodiments, different shapes may be utilized for the cross-section of the first prong 62.

As shown in FIGS. 1-4, the first and second prongs 62, 66 each extend outwardly from a base 61. In some embodiments, the first ends 63, 67 of the first and second prongs 62, 66 may simply be connected to each other, such as by welding, fasteners, or adhesives. In the embodiment shown in the figures, a common base 61 is utilized from which the first and second prongs 62, 66 each extend, with the base 61 being flush against the first end 42 of the sleeve 40.

Figure 3:
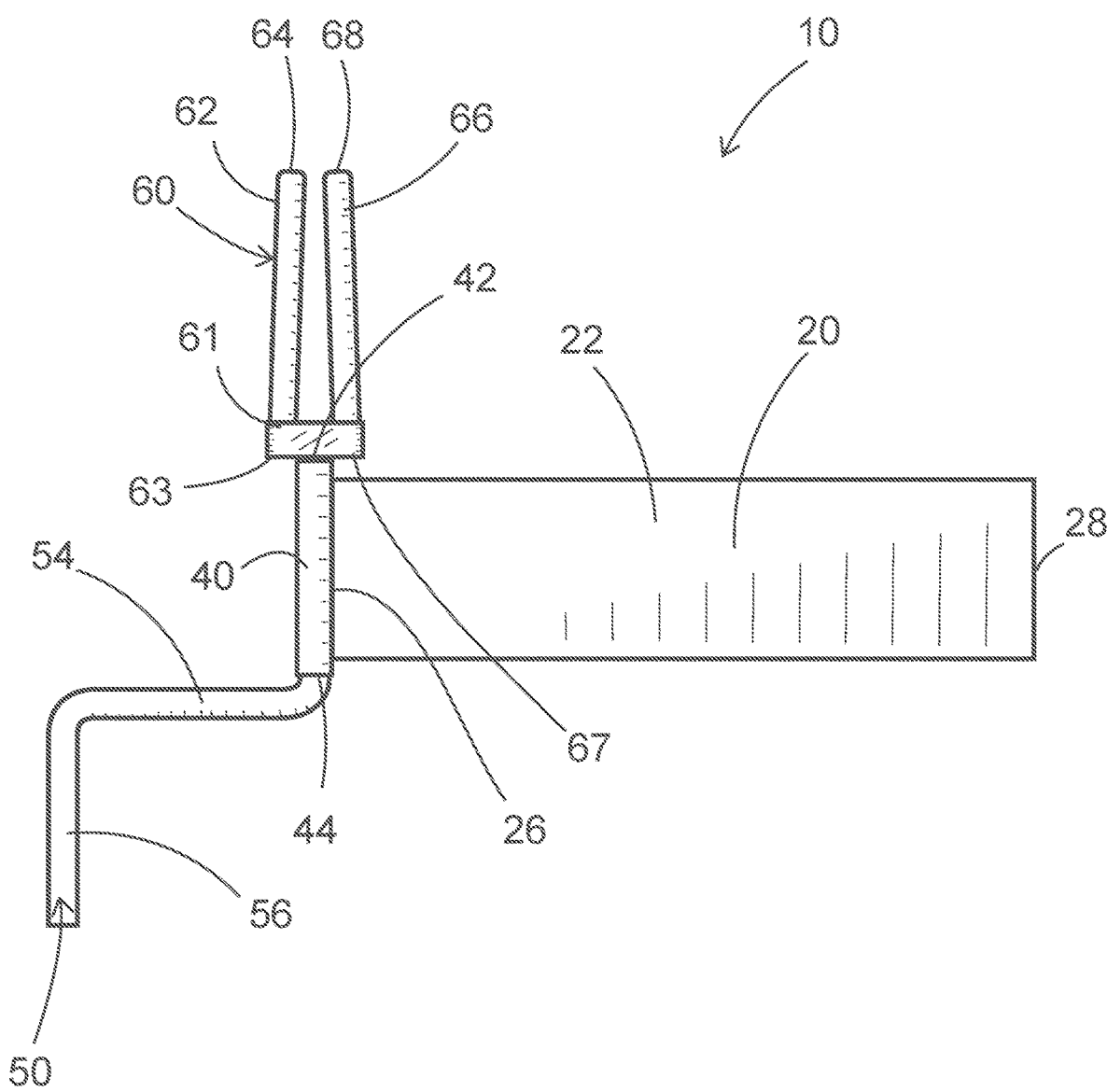
FIG. 3 is a top view of a strap winding device in accordance with an example embodiment.

As best shown in FIGS. 3 and 4, the prongs 62, 66 are preferably angled towards each other so as to assist with removal of a wound strap 18 from the reel 60 after winding the strap 18 onto the reel 60. The respective angles of the prongs 62, 66 may vary in different embodiments. In the exemplary embodiment shown in the figures, the first end 63 of the first prong 62 is distally spaced at a first distance from the first end 67 of the second prong 66 and the second end 64 of the first prong 62 is distally spaced at a second distance from the second end 68 of the second prong 63, wherein the first distance is greater than the second distance such that the prongs 62, 66 are angled towards each other as shown in the figures.

Each of the prongs 62, 66 are not parallel with respect to each other, but instead angled towards each other. The first prong 62 and second prong 66 are thus diagonally-oriented towards each other such that a slope is formed; aiding with removal of the wound strap 18 from the reel 60 after the strap 18 has been wound onto the reel 60. This is particularly beneficial with larger straps 18, which may become lodged or stuck onto reels 60 which are not so oriented. The angular orientation of the prongs 62, 66 towards each other creates a sloped surface which aids in sliding the wound strap 18 off of the reel 60 after use. In some embodiments, an operator need only point both prongs 62, 66 downwardly such that the wound strap 18 will slide off of the reel 60 without any further intervention on the part of the operator.

D. Operation of Preferred Embodiment

FIGS. 6-10 illustrate the strap winding device 10 in use to wind up a cargo strap 18 onto the reel 60. While the figures illustrate that a trailer 14 is utilized as the mounting point for the strap winding device 10, it should be appreciated that other structures could be utilized to anchor the strap winding device 10 when winding the strap 18. Further, the type of strap 18 illustrated should not be construed as limiting, as the reel 60 may be utilized to wind up a wide range of different types of straps 18.

The systems and methods disclosed herein are particularly useful for Conestoga trailers 14 which are common in the shipping and transport industry but generally lack a structure onto which to clamp a reeling device. The strap winding device 10 is thus configured to be removably inserted and temporarily secured within an opening on the trailer 14, such as a stake pocket of the trailer 14.

Figure 6:
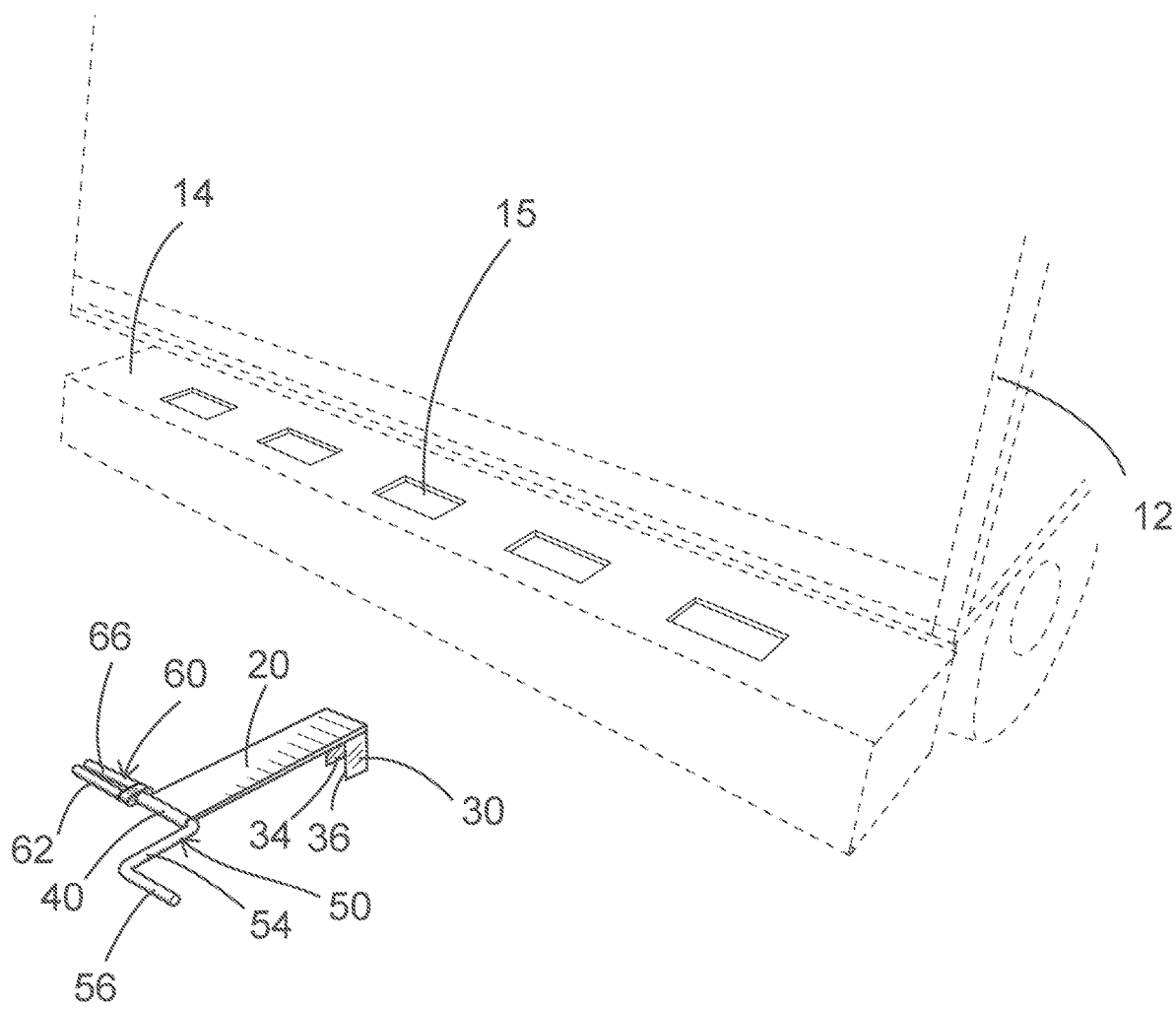
FIG. 6 is a perspective view illustrating a strap winding device aligned for insertion within a trailer of a vehicle in accordance with an example embodiment.

In use, the strap winding device 10 is used after reaching a destination and removing the strap 18 from the load which the strap 18 is securing. The strap winding device 10 is first oriented and positioned in alignment with the trailer 14 such as shown in FIG. 6. An operator may grasp the main body 20 of the strap winding device 10, which can serve as a gripping point for carrying the strap winding device 10. With the main body 20 in hand, the operator may align the strap winding device 10 with the trailer 14 for use.

Figure 7:
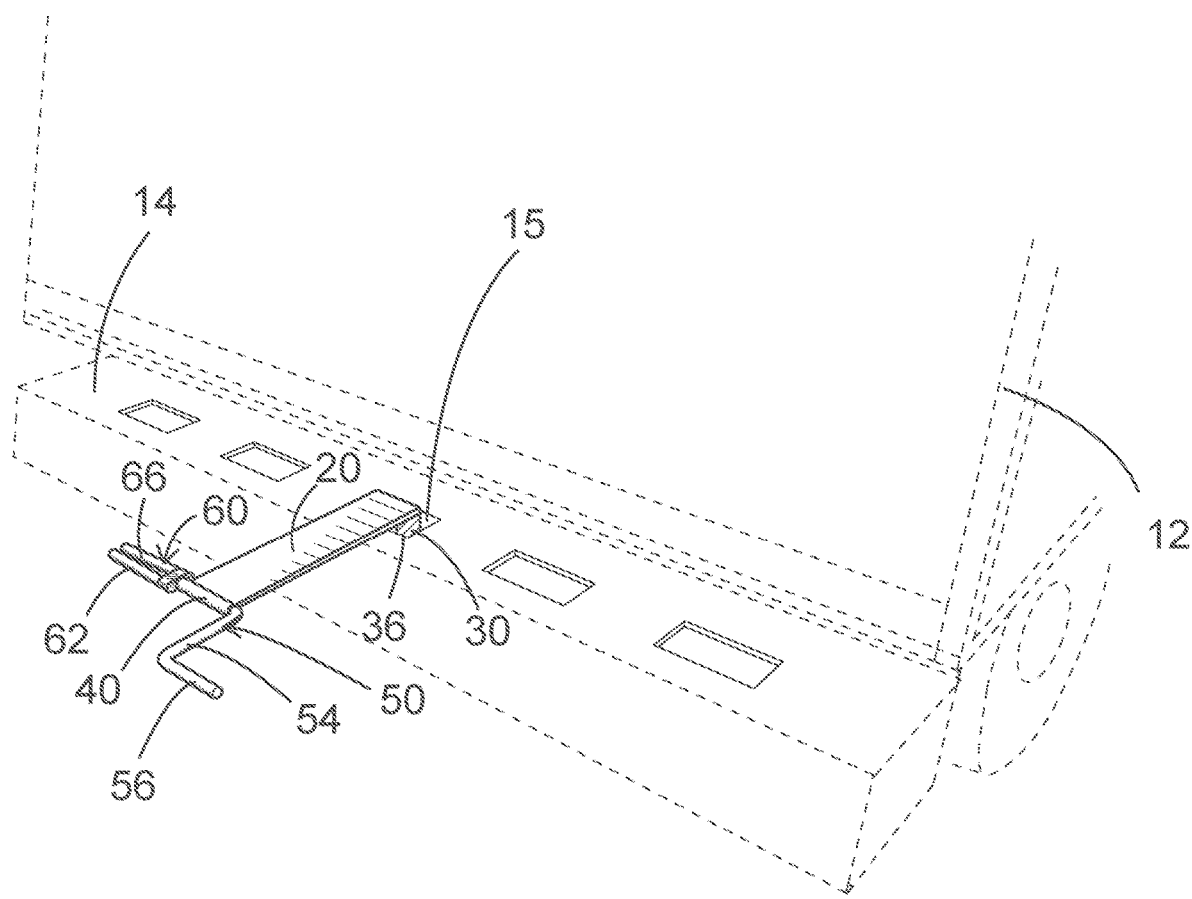
FIG. 7 is a perspective view illustrating a strap winding device inserted within a trailer of a vehicle in accordance with an example embodiment.

As shown in FIG. 7, once so aligned, the operator may secure the strap winding device 10 to the trailer 14 of the vehicle 12. The mount 30 of the strap winding device 10 is positioned within an opening 15 on the trailer 14, such as a trailer stake pocket as shown in the figures. The mount 30 will easily fit within the opening 15 such as shown in FIG. 7 so as to support the main body 20, with the main body 20 being of sufficient length to pass over and outwardly from the trailer 14. The length of the main body 20 is preferably of sufficient length that the winder 50 may be freely rotated without contacting any portion of the trailer 14 such as shown in the figures.

Continuing to reference FIG. 7, it can be seen that the strap winding device 10 is removably positioned and secured within the opening 15 of the trailer 14. The mount 30 is configured to "catch" within the opening 15 such that only lifting the mount 30 vertically upward will remove the mount 30 from within the opening 15. This prevents unintentional or premature expulsion of the mount 30 from within the opening 15, particularly due to forces imparted upon the strap winding device 10 during rotation of the winder 50 and reel 60. Thus, pushing downwardly on the main body 20, for example, will not dislodge the mount 30 from within the opening 15.

Figure 8:
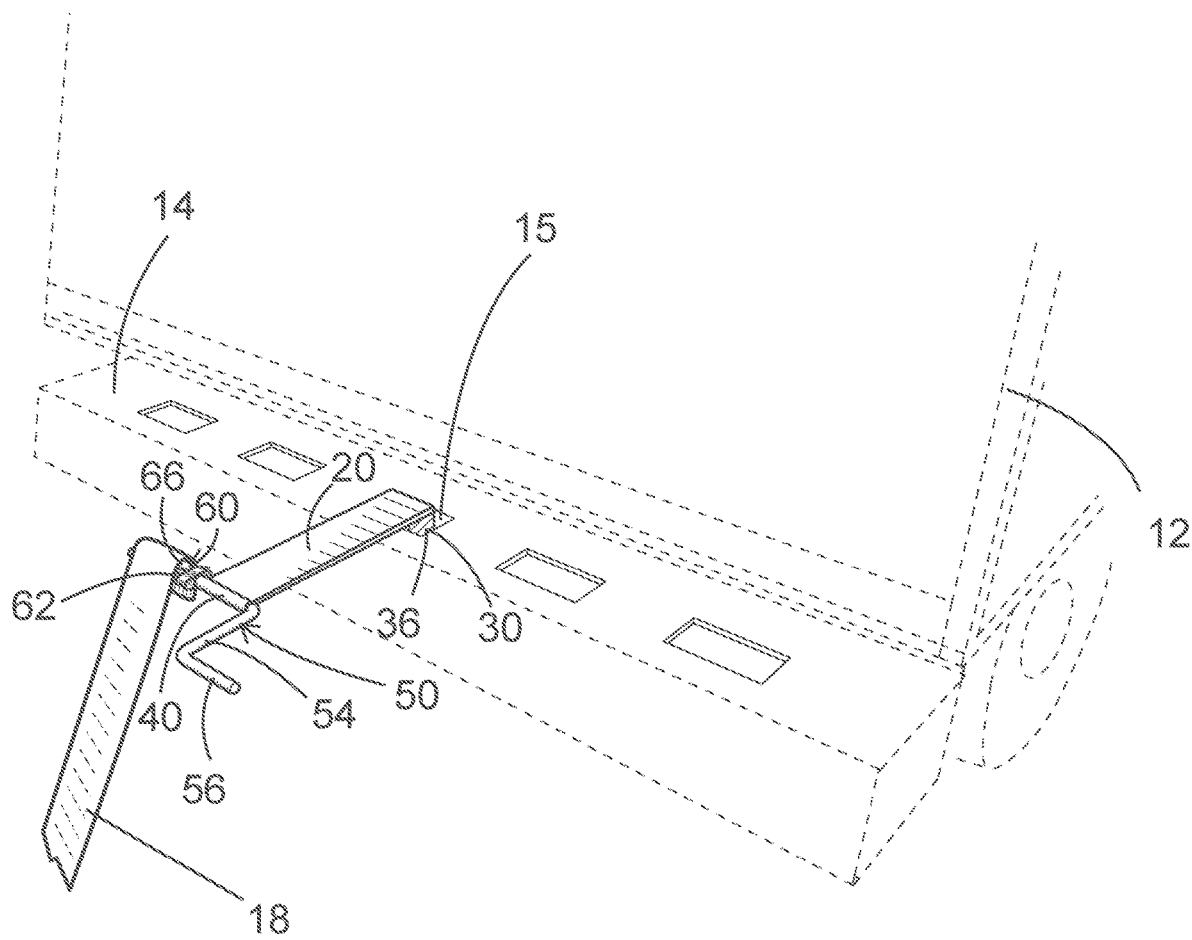
FIG. 8 is a perspective view illustrating a strap secured to a strap winding device in accordance with an example embodiment.

With the mount 30 secured within the opening 15 of the trailer 14, the strap 18 may be wound onto the reel 60. As shown in FIG. 8, the strap 18 is first removably secured to the reel 60 by, for example, inserting a distal end of the strap 18 between the first and second prongs 62, 66 of the reel 60. The strap 18 may be passed over the first prong 62 and then allowed to fall between the first and second prongs 62, 66 as shown in FIG. 8. With the strap 18 so positioned on the reel 60, the strap 18 may be wound onto the reel 60.

Figure 9:
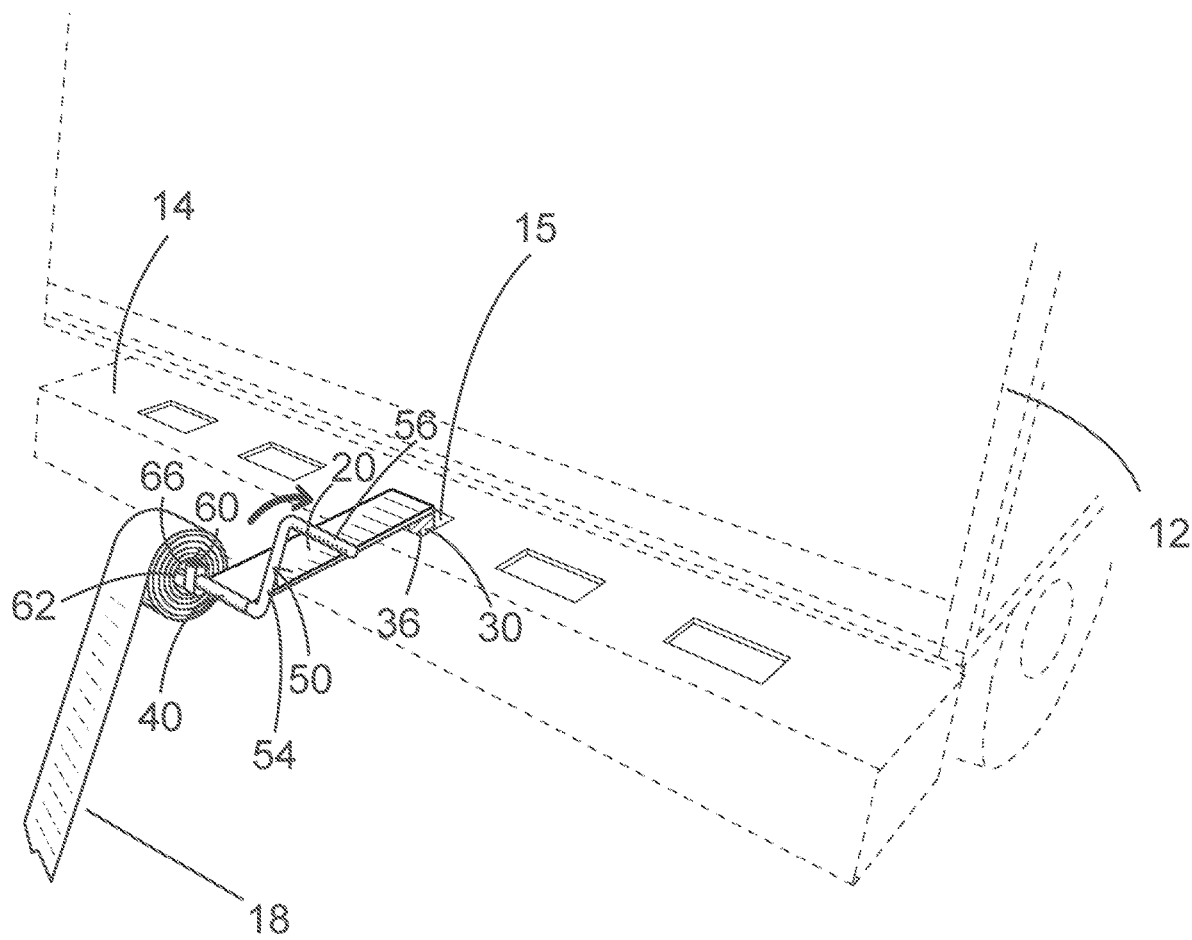
FIG. 9 is a perspective view illustrating a strap being wound onto a strap winding device in accordance with an example embodiment.

FIG. 9 illustrates the strap 18 being wound onto the reel 60 of the strap winding device 10, with the strap winding device 10 being secured against the trailer 14 by the mount 30 being removably positioned within the opening 15 such as a trailer stake pocket. After the strap 18 has been inserted between the prongs 62, 66, an operator may grasp the handle 56 of the winder 50 and rotate the handle 56 in a first direction or a second direction. It should be appreciated that the handle 56 (and winder 50) may be rotated in either direction to wind the strap 18 onto the reel 60. Once a direction for winding is selected, the opposite direction of rotation will unwind the strap from the reel 60.

FIG. 9 illustrates an embodiment in which the strap winding device 10 is connected to the trailer 14 by the mount 30 being inserted within the opening 15 such as a stake pocket of the trailer 14 and remaining therein during winding. The main body 20 rests upon and extends past the outer edge of the trailer 14 at a sufficient length to allow free rotation of the winder 50 without any portion of the winder 50, such as the handle 56, from contacting the trailer 14 or any other structure.

The handle 56 is then grasped and rotated by the operator, which rotates the winder 50 within the sleeve 40 of the strap winding device 10. Rotation of the winder 50 is operable to rotate the reel 60, with the prongs 62, 66 of the reel 60 rotating so as to wind the strap 18 onto the reel 60 over the pair of prongs 62, 66. In the exemplary embodiment shown in FIG. 9, the winder 50 is rotated in a direction towards the trailer 14 (clockwise). However, the opposite direction of rotation can be utilized if desired, with the winder 50 instead being rotated in a direction away from the trailer 14 (counter-clockwise). In either case, the same direction of rotation is maintained so as to wind the strap 18 onto the reel 60.

Figure 10:
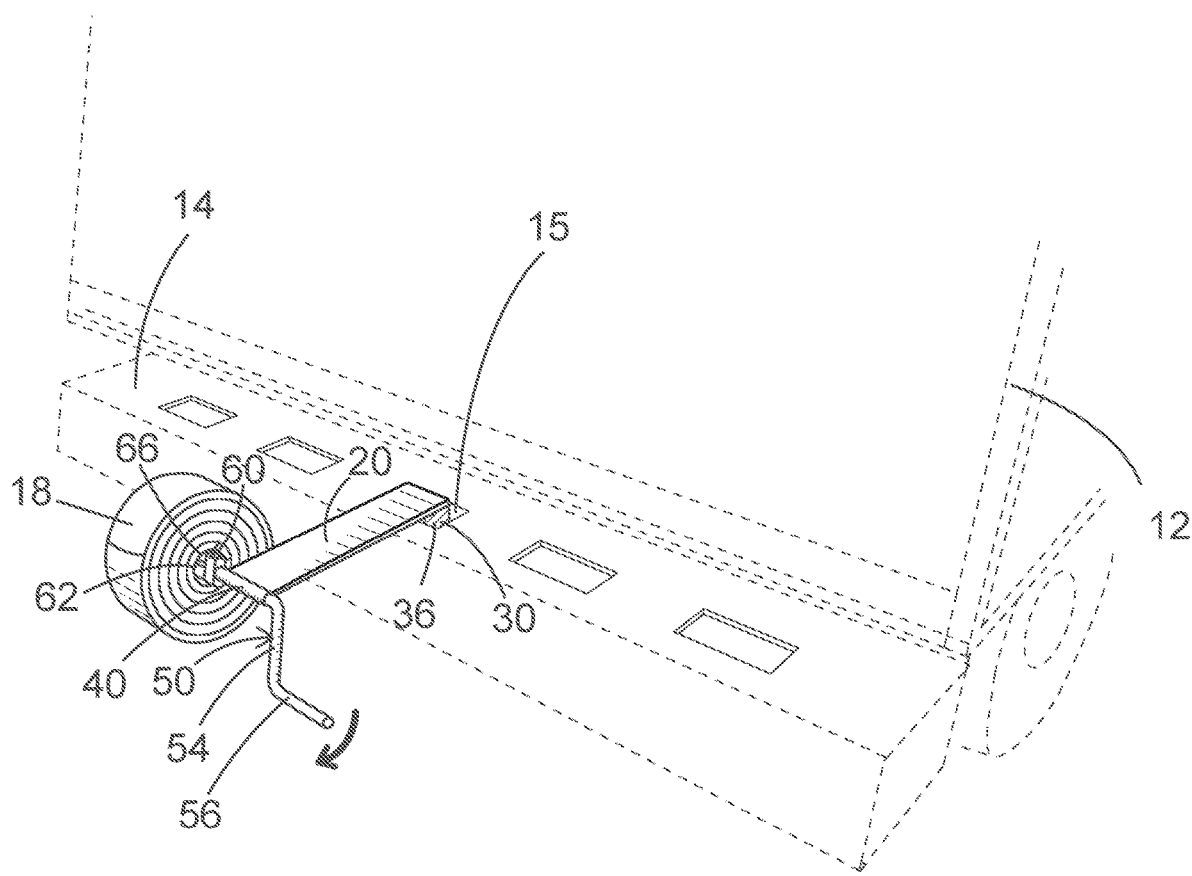
FIG. 10 is a perspective view illustrating a strap wound onto a strap winding device in accordance with an example embodiment.

FIG. 10 illustrates the strap 18 wound onto the reel 60 after the rotation of the winder 50 from FIG. 9. As can be seen, the strap 18 may be fully wound onto the reel 60, with the strap 60 extending around both the first and second prongs 62, 66 in a wound-up manner. The wound strap 18 may then be removed from the reel 60. The removal of the wound strap 18 from the reel 60 is eased by the orientation of the prongs 62, 66, which are angled towards each other such that the wound strap 18 may be easily pulled or dropped off of the reel 60. The angling of the prongs 62, 66 towards each other creates a natural slope to ease the wound strap 18 off of the reel 60 after use. For example, an operator may simply point the prongs 62, 66 towards a ground surface so that the wound reel strap 18 simply falls off of the reel 60. In other embodiments, the wound strap 18 may be pulled off of the reel 60 manually by the operator.

After removal of the wound strap 18 from the reel 60, the strap winding device 10 may be kept in the same opening 15 so as to be in position to wind further straps 18 onto the reel 60. The same steps described above may be repeated until all straps 18 have been wound up and removed from the reel 60. Once finished with winding all straps 18, an operator need only grasp the main body 20 of the strap winding device 10 and lift straight upwardly so as to remove the mount 30 from the opening 15 and thus remove the strap winding device 10 from connection to the trailer 14. The strap winding device 10 may then be carried away from transport to another location, or stored for future use, such as within the vehicle 12 to which the trailer 14 is attached.

Unless otherwise defined, all technical and scientific terms used herein have the same meaning as commonly understood by one of ordinary skill in the art to which this invention belongs. Although methods and materials similar to or equivalent to those described herein can be used in the practice or testing of the strap winding device, suitable methods and materials are described above. All publications, patent applications, patents, and other references mentioned herein are incorporated by reference in their entirety to the extent allowed by applicable law and regulations. The strap winding device may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A strap winding device, comprising:
   a main body having a first end and a second end;
   a mount connected to the main body, wherein the mount is connected at or near the second end of the main body;
   a winder rotatably connected to the mount at or near the first end of the main body, wherein the winder comprises a handle adapted to rotate the winder; and
   a reel connected to the winder, wherein the reel comprises a first prong and a second prong, wherein the first prong and the second prong are angled towards each other, wherein the first prong and the second prong are each adapted to rotate when the handle is rotated so as to wind a strap around the first prong and the second prong.

2. The strap winding device of claim 1, wherein the mount is comprised of a C-channel.

3. The strap winding device of claim 1, wherein the mount is at a right angle with respect to the main body such that the mount extends perpendicularly with respect to the main body.

4. The strap winding device of claim 1, wherein the winder comprises a main portion rotatably connected to the main body and a linkage extending at a right angle with respect to the main portion.

5. The strap winding device of claim 4, wherein the handle extends at a right angle with respect to the linkage.

6. The strap winding device of claim 1, wherein a length of the main body is greater than a length of the mount.

7. The strap winding device of claim 1, wherein the first prong and the second prong are each comprised of a rod.

8. The strap winding device of claim 1, wherein the reel comprises a base, wherein the first prong and the second prong each extend outwardly from the base.

9. The strap winding device of claim 1, wherein the first prong comprises an inner end and a distal end and wherein the second prong comprises an inner end and a distal end, wherein a distance between the inner end of the first prong and the inner end of the second prong is greater than a distance between the distal end of the first prong and the distal end of the second prong.

10. A method of winding a strap using the strap winding device of claim 1, comprising the steps of:
    inserting a distal end of the strap between the first prong and the second prong;
    rotating the handle so as to rotate the winder and the reel; and
    winding the strap around the first prong and the second prong of the reel.

11. A strap winding device, comprising:
    a main body having a first end and a second end;
    a mount connected to the main body, wherein the mount is connected at or near the second end of the main body;
    a winder rotatably connected to the mount at or near the first end of the main body, wherein the winder comprises a handle adapted to rotate the winder; and
    a reel connected to the winder, wherein the reel comprises a base, a first prong extending from the base and a second prong extending from the base, wherein the first prong and the second prong are angled towards each other, wherein the first prong and the second prong are each adapted to rotate when the handle is rotated so as to wind a strap around the first prong and the second prong;
    wherein the first prong comprises an inner end and a distal end and wherein the second prong comprises an inner end and a distal end, wherein a distance between the inner end of the first prong and the inner end of the second prong is greater than a distance between the distal end of the first prong and the distal end of the second prong.

12. The strap winding device of claim 11, wherein the mount is comprised of a C-channel.

13. The strap winding device of claim 11, wherein the mount is at a right angle with respect to the main body such that the mount extends perpendicularly with respect to the main body.

14. The strap winding device of claim 11, wherein the winder comprises a main portion rotatably connected to the main body and a linkage extending at a right angle with respect to the main portion.

15. The strap winding device of claim 14, wherein the handle extends at a right angle with respect to the linkage.

16. The strap winding device of claim 11, wherein the first prong and the second prong are each comprised of a rod.

17. A method of winding a strap using the strap winding device of claim 11, comprising the steps of:
    inserting a distal end of the strap between the first prong and the second prong;
    rotating the handle so as to rotate the winder and the reel; and
    winding the strap around the first prong and the second prong of the reel.

18. A strap winding device, comprising:
- a main body having a first end and a second end;
- a sleeve connected to the main body at or near the first end of the main body;
- a winder rotatably connected to the sleeve, wherein the winder comprises a handle adapted to rotate the winder; and
- a reel connected to the winder, wherein the reel comprises a base, a first prong extending from the base and a second prong extending from the base, wherein the first prong and the second prong are angled towards each other, wherein the first prong and the second prong are each adapted to rotate when the handle is rotated so as to wind a strap around the first prong and the second prong;
- wherein the first prong comprises an inner end and a distal end and wherein the second prong comprises an inner end and a distal end, wherein a distance between the inner end of the first prong and the inner end of the second prong is greater than a distance between the distal end of the first prong and the distal end of the second prong.

19. The strap winding device of claim 18, wherein the first prong and the second prong are each comprised of a rod.

20. A method of winding a strap using the strap winding device of claim 18, comprising the steps of:
- inserting a distal end of the strap between the first prong and the second prong;
- rotating the handle so as to rotate the winder and the reel; and
- winding the strap around the first prong and the second prong of the reel.

\* \* \* \* \*